United States Patent
Van Ouwerkerk

Patent Number: 5,462,230
Date of Patent: Oct. 31, 1995

[54] OUTFLOW NOZZLE HAVING INDEPENDENTLY ADJUSTABLE OUTFLOW PIPES

[75] Inventor: Pieter J. Van Ouwerkerk, Zaandam, Netherlands

[73] Assignee: P.J. Van Ouwerkerk Holding B.V., Zaandam, Netherlands

[21] Appl. No.: 190,104

[22] PCT Filed: Aug. 3, 1992

[86] PCT No.: PCT/NL92/00139

§ 371 Date: Apr. 14, 1994

§ 102(e) Date: Apr. 14, 1994

[87] PCT Pub. No.: WO93/02881

PCT Pub. Date: Feb. 18, 1993

[30] Foreign Application Priority Data

Aug. 2, 1991 [NL] Netherlands ............................ 9101337

[51] Int. Cl.⁶ ................................ B05B 1/14; B05B 7/00; B05B 15/08
[52] U.S. Cl. ................................ 239/428.5; 239/587.4; 239/597; 285/151; 285/261
[58] Field of Search ............................ 239/428.5, 587.1, 239/587.3, 587.4, 597, 599; 285/150, 151, 261

[56] References Cited

U.S. PATENT DOCUMENTS

| | | | |
|---|---|---|---|
| Re. 20,488 | 8/1937 | Zinkil | 239/428.5 |
| 1,100,416 | 6/1914 | Barger | 285/151 X |
| 1,730,348 | 10/1929 | Anstiss | 239/587.4 |
| 2,717,792 | 9/1955 | Pelley | 285/261 X |
| 3,103,155 | 9/1963 | Boylan et al. | |
| 3,471,091 | 10/1969 | Baker | 239/428.5 X |
| 4,408,721 | 10/1983 | Cohen et al. | 239/587.4 X |
| 4,542,854 | 9/1985 | Mathis | 239/587.4 X |
| 4,732,328 | 3/1988 | Schydlo | 239/587.4 X |
| 4,742,965 | 5/1988 | Messinger et al. | 239/587.4 X |

FOREIGN PATENT DOCUMENTS

| | | | |
|---|---|---|---|
| 0405379 | 1/1991 | European Pat. Off. | |
| 353605 | 10/1937 | Italy | 239/587.4 |
| 1317251 | 5/1973 | United Kingdom | |

*Primary Examiner*—William Grant
*Attorney, Agent, or Firm*—Young & Thompson

[57] ABSTRACT

Outflow nozzle comprising a support with an outflow element (3) fitted therein. The support is provided with a cavity in which one end (5) of the outflow element can be accommodated. The end is spherical, and the outflow element is hinged relative to the support. The outflow element comprises a number of outflow pipes (9–11) which are movable relative to each other. The lower boundary of these outflow pipes is formed by spherical parts (12–14) which together form the spherical end accommodated in the cavity of the support.

9 Claims, 3 Drawing Sheets

5,462,230

OUTFLOW NOZZLE HAVING INDEPENDENTLY ADJUSTABLE OUTFLOW PIPES

FIELD OF THE INVENTION

The invention relates to an outflow nozzle comprising a support with an outflow element pivotally arranged therein. The outflow element has a spherical end confined so that it rotates inside a cavity of the support.

BACKGROUND OF THE INVENTION

Such an outflow nozzle is generally known in the prior art. In this case the outflow element at the inflow end comprises a spherical part which can be accommodated in a corresponding cavity of the support. Such outflow nozzles have many applications, such as in ventilation systems for cars and aircraft, but are also used in baths and the like. Fitting the outflow element in a hinged manner ensures that the emerging flow, such as air, is directed as desired on, for example, the user. If directing at more than one place, for example for more than one user, or at several places is desired by a user, it is known in the prior art to produce multiple outflow nozzles comprising a number of adjacent outflow nozzles of the type described above.

However, such an embodiment has a number of disadvantages. On account of the considerable space taken up by the hinged fitting, there is a considerable distance between the different outflow nozzles, and in the region between said outflow nozzles no flow can be produced. For certain applications it is necessary to release the emerging medium in a relatively thin jet, in order to maximize the effect experienced. With the use of different adjacent outflow nozzles a very complex control is necessary for this. Besides, there is the disadvantage that the outflow apertures of the outflow elements, which are generally round, are difficult to grip and to position, in particular in situations in which they are smooth, as in the case of use under water.

SUMMARY OF THE INVENTION

The object of the present invention is to avoid these disadvantages. This object is achieved in a device of the type described above in that the outflow element comprises at least two adjacent outflow pipes, while each outflow pipe is provided with a spherical part, and the spherical parts of the outflow pipes together essentially form the spherical end.

The invention is based on the idea of dividing the outflow element into a number of outflow pipes. In this case the inflow end of the outflow pipes is always in the form of a spherical part, and all spherical parts of the adjacent outflow pipes together form the spherical end, as known in the prior art.

The movement of the outflow pipes according to the invention relative to each other in a first embodiment of the invention is carried out in such a way that they can only slide along each other. In other words, only positioning of the outflow pipes differently from each other about a line of rotation of the spherical end of the spherical element is possible.

According to a further advantageous embodiment, not only is rotation of the outflow pipes relative to each other possible, but displacement is also possible. For this, it is necessary for at least one boundary face of adjacent spherical parts to be curved and positioned with the top of the curve near the center of rotation for moving them towards or away from each other. With this embodiment not only does sliding along each other take place, but a combined rotating, tilting and sliding movement can also be achieved. Such an embodiment is a particular advantage if three outflow pipes are present, the outflow pipe lying in the center being provided with flat boundary faces, and the outflow pipes adjacent to it being provided with the above-described curved boundary faces.

With the device according to the invention it is possible in an aesthetically simple way to make the outflow end of the outflow pipes essentially rectangular. It has been found that, in particular in circumstances in which gripping these pipes is difficult, making them rectangular provides an improved grip compared with the usual round embodiment.

Although it is possible with the outflow nozzle described above to meter a fluid, it is also possible to convey two or more fluids through it. If the outflow nozzle is being used in, for example, a whirlpool, a combination of air and water can be blown out with it. In order to achieve this, in the case of the outflow nozzle according to the invention at least one outflow pipe is provided with means for feeding different fluids to it. These means can comprise an inlet for a fluid disposed near the end of the outflow pipe lying diametrically opposite the outflow end. It is also possible to provide a supply of fluid near the hinge point of the spherical end.

In order to obtain a water jet effect, by means of which, for example in the air-water combination the air is entrained, the outlets for the different fluids can be disposed upstream of the outflow end of the outflow element.

BRIEF DESCRIPTION OF THE DRAWINGS

The invention will be explained in greater detail below with reference to examples of embodiments illustrated in the drawings, in which.

DETAILED DESCRIPTION OF THE INVENTION

Figure 1:
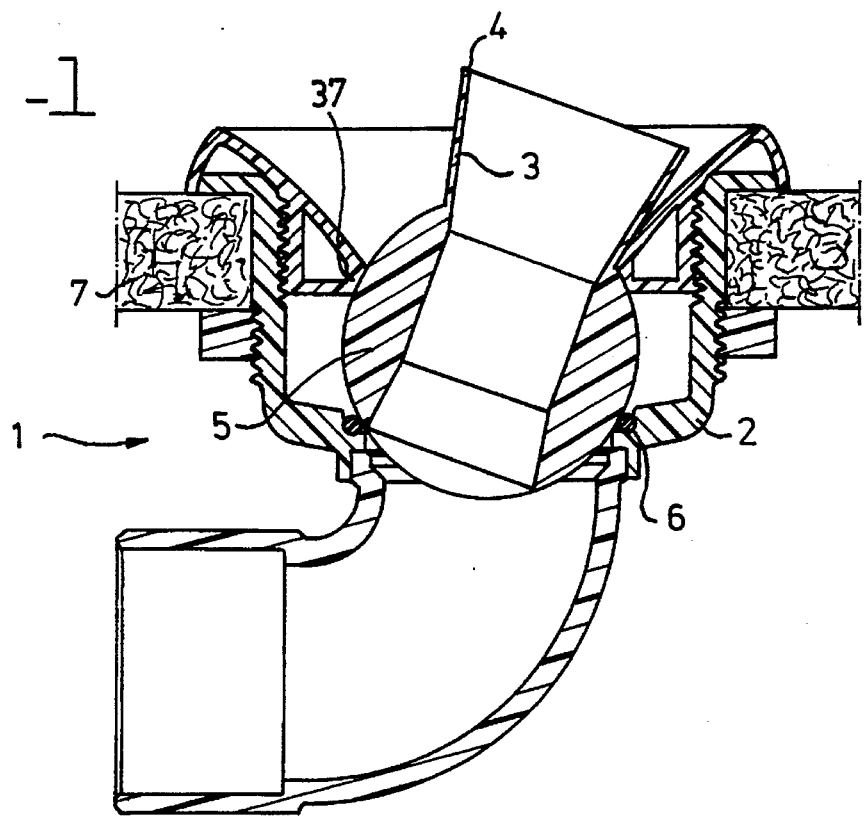
FIG. 1 shows in cross-section an outflow nozzle according to the prior art.

FIG. 1 shows an outflow nozzle indicated in its entirety by 1. It comprises a support 2 with an outflow element 3 hinged therein. Outflow element 3 is provided with an outflow end 4 and a spherical end 5, which is accommodated between flange 37 of the support and an O-ring 6, which also serves as a seal. Support 2 in the embodiment shown is provided in an only partially shown wall 7. The device shown in FIG. 1 can be used for supplying air or any other fluid and, through directing the outflow end 4, which is made round, the user can receive a jet of air as desired.

Figure 3:
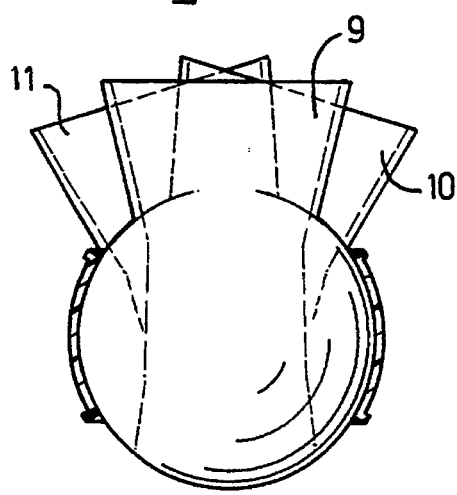
FIG. 3 shows the outflow nozzle according to FIG. 2, but turned through 90° about the vertical axis relative to FIG. 2.
Figure 2:
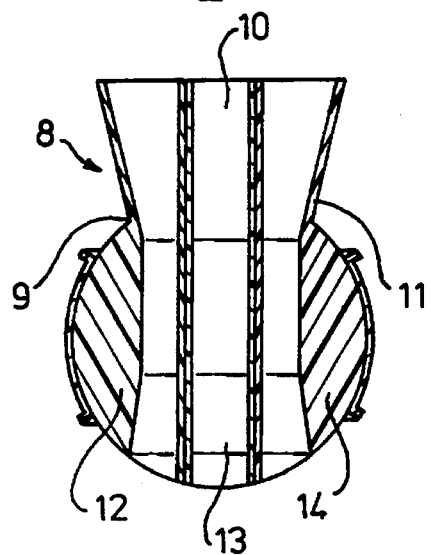
FIG. 2 shows in cross-section a part of the device according to FIG. 1, but in which a modification according to the invention is made.

FIG. 2 shows a first embodiment of the invention in cross-section, and in particular only the outflow element, which is indicated in its entirety by 8. It is composed of outflow pipes 9, 10 and 11. Outflow pipe 9 is provided with a spherical part 12, outflow pipe 10 with a spherical part 13, and outflow pipe 11 with a spherical part 14. As can be seen from FIG. 2, these spherical parts together form the spherical end which corresponds to part 5 in FIG. 1. Due to the fact that at right angles to the plane of drawing outflow pipe 10 also has a spherical boundary face, the spherical parts cannot slip out of the cavity of support 2. As shown in FIG. 3, it is possible to place these outflow pipes in different positions relative to each other. In this way the requirements of different users can be met, or a user can experience the desired feeling at different places. It is only possible here to move the outflow pipes 9, 10, 11 in one plane relative to each other.

Figure 4:
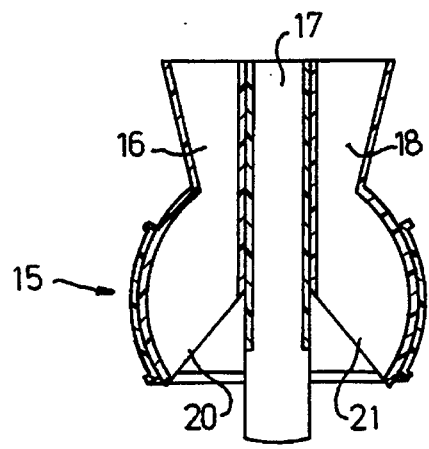
FIG. 4 shows a further embodiment of the invention in cross-section, shown in a first position.
Figure 5:
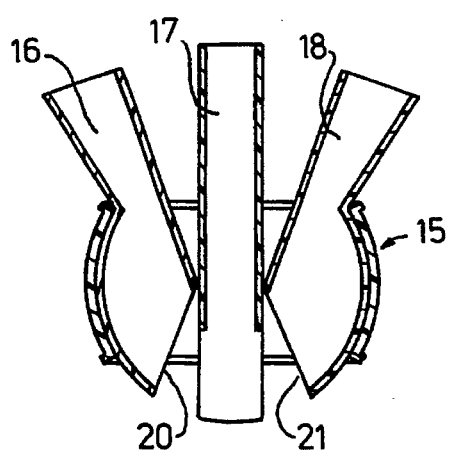
FIG. 5 shows the outflow nozzle according to FIG. 4 in a second position.
Figure 6:
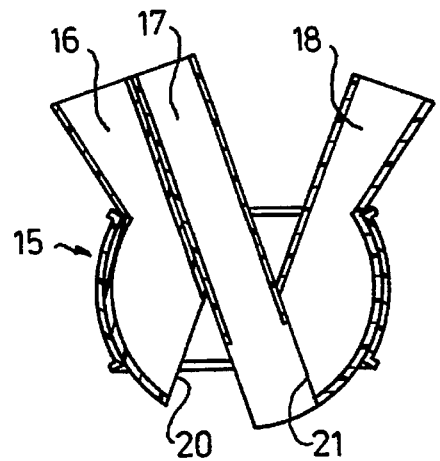
FIG. 6 shows the outflow nozzle according to FIG. 4 in a third position.
Figure 7:
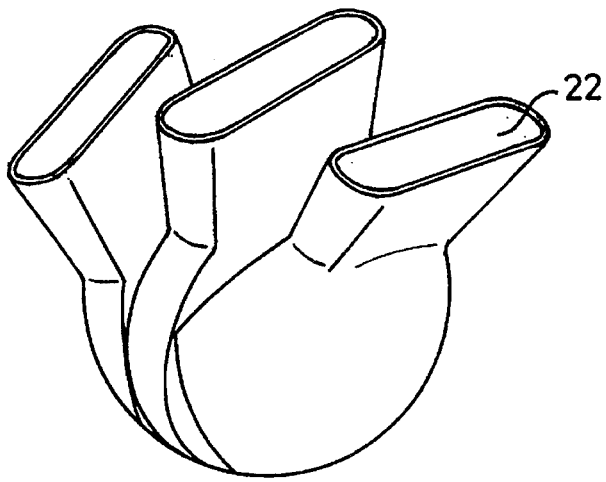
FIG. 7 shows a schematic view of the outflow nozzle according to FIGS. 4–6.

FIG. 4 shows a further embodiment of the device according to the invention. In this case the outflow element is indicated in its entirety by 15, and is composed of outflow pipes 16, 17 and 18. Unlike the embodiment described above, the boundary wall of outflow pipe 16 and the boundary wall of the outflow pipe 18 with outflow pipe 17 is not made flat, but is provided with a curved part 20, 21. This makes it possible to tilt the outflow pipes 16, 18 relative to outflow pipe part 17, as shown in FIGS. 5–7. In addition, the rotation possibility described with reference to FIGS. 2 and 3 remains in one plane, with the result that a particularly versatile outflow nozzle which can be used for many applications is produced.

The essentially rectangular shape of the outflow ends 22 of the different outflow pipes can be seen from FIG. 7. Such a rectangular shape is easier to grip than the round shape of outflow ends shown in FIG. 1.

As an example for use, all kinds of ventilation systems and outflow apertures for, for example, whirlpools can be mentioned here.

Figure 8:
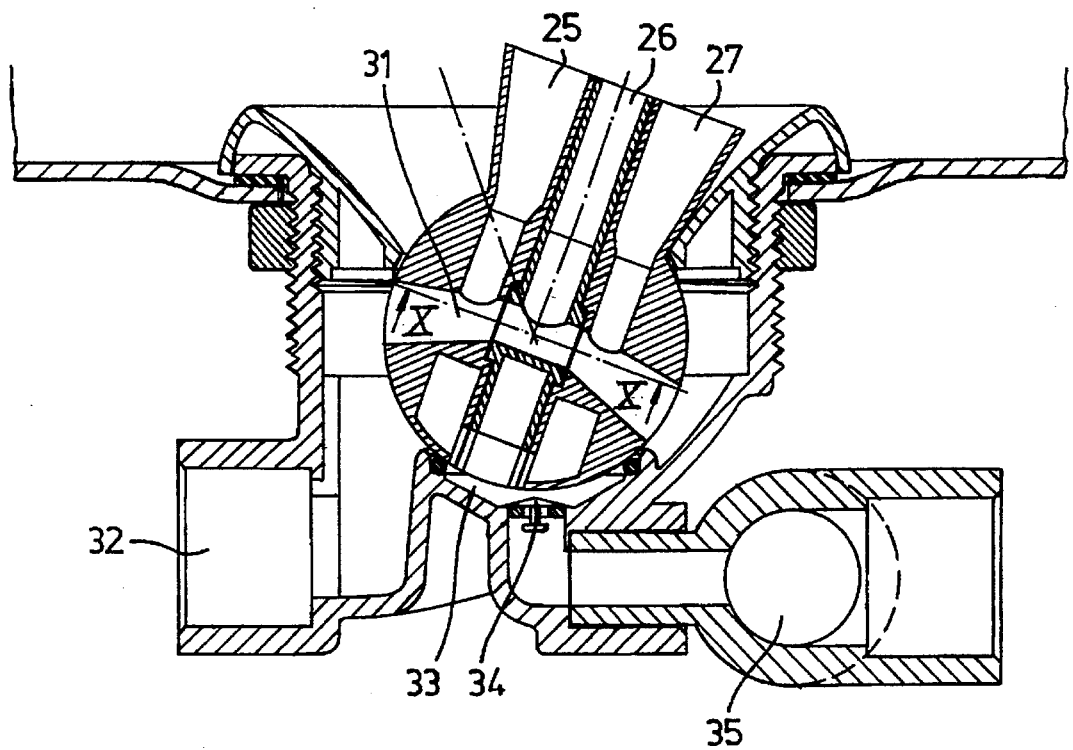
FIG. 8 shows a cross-section of an outflow nozzle for two fluids.
Figure 9:
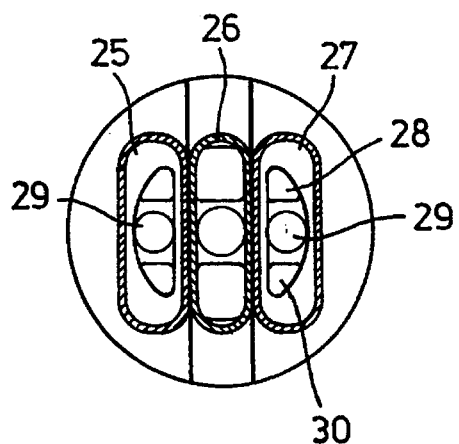
FIG. 9 shows a top view of the outflow nozzle according to FIG. 8.
Figure 10:
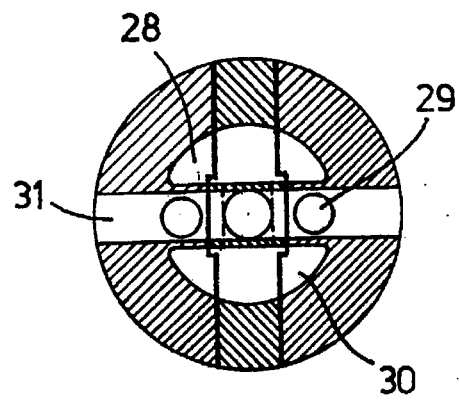
FIG. 10 shows a cross-section along the line X—X from FIG. 8.

When applied in whirlpools it is often desirable to introduce a spray of water and air. For this, the embodiment according to FIGS. 8–10 is proposed. The different outflow pipes are indicated by 25, 26 and 27. Each outflow pipe in this case comprises three ducts 28, 29 and 30. Here, 28 and 30 are air supply ducts and duct 29 is a water supply duct. Ducts 29 are connected by means of a collecting duct 31 to water supply pipe 32. Ducts 28 and 30 for air are connected by means of collecting chamber 33 and non-return valve 34 to air supply 35. Non-return valve 34 is used to prevent water from being able to flow out of the bath (not shown) into the air system when the pressure on pipe 35 has been switched off. If pressure is applied to pipe 35, air will enter the collecting chamber 33 through valve 34 and flow through the different ducts 28 and 30 upwards through the different outflow pipes 25, 26 and 27. The supply of air can take place by excess pressure, but also by vacuum. Since the outlet of ducts 28 and 30 lies below the outflow end of the different outflow pipes 25–27, a vacuum will be created therein on the movement of water through outflow pipe 29, as a result of which air is sucked in, with the result that the intended whirl effect is obtained.

Although the invention is described above with reference to a preferred embodiment, it must be understood that numerous modifications can be made to it without going beyond the scope of the present application. For example, it is possible to provide the outflow nozzle with valves known in the prior art, which can be operated by, for example, turning the outflow element. It is also possible to make the nozzle move with some device known in the prior art. The cavity in which the outflow element lies need not be spherical. All that is important is the presence of two boundary faces between which the outflow element is confined so that it rotates. All these modifications are considered to lie with the scope of the appended claims.

I claim:

1. Outflow nozzle comprising a support with an outflow element pivotally arranged therein, said outflow element having a spherical end confined so that it rotates inside a boundary of a cavity of the support, said outflow element comprising at least two adjacent outflow pipes, each outflow pipe being provided with a spherical part, wherein the spherical parts of the outflow pipes together essentially form the spherical end, and wherein boundary faces of two adjacent spherical parts are arranged to move over each other, such that the direction of discharge of each outflow pipe may be independently adjusted with respect to the direction of discharge of any said adjacent outflow pipe.

2. Outflow nozzle according to claim 1, wherein the boundary faces of two adjacent spherical parts are flat.

3. Outflow nozzle according to claim 1, wherein at least one boundary face of two adjacent spherical parts is curved, with the top of the curve near the center of rotation of said spherical part.

4. Outflow nozzle according to claim 3, comprising two outflow pipes forming the outer boundary of the outflow element, and at least one outflow pipe lying between them with a spherical part with flat boundary faces.

5. Outflow nozzle according to claim 1, wherein the outflow pipes have an outflow end which is essentially rectangular.

6. Outflow nozzle according to claim 1, wherein at least one outflow pipe is provided with means for supplying different fluids to it.

7. Outflow nozzle according to claim 6, wherein a fluid inlet is disposed near an end of the outflow pipe lying diametrically opposite an outflow end.

8. Outflow nozzle according to claim 6, wherein a fluid inlet is provided near a pivot point of the spherical end.

9. Outflow nozzle according to claim 6, wherein outlets for the different fluids are disposed upstream of an outflow end of said at least one outflow pipe.

\* \* \* \* \*